D. Steck,
Means for Fish to Pass over Dams.
N° 55,929. Patented June 26, 1866.
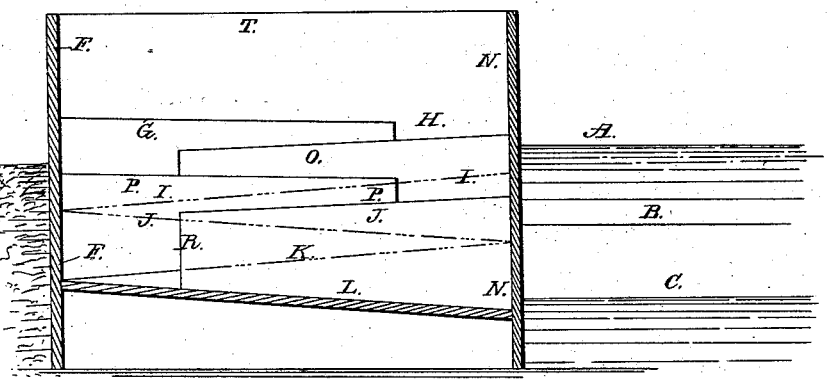
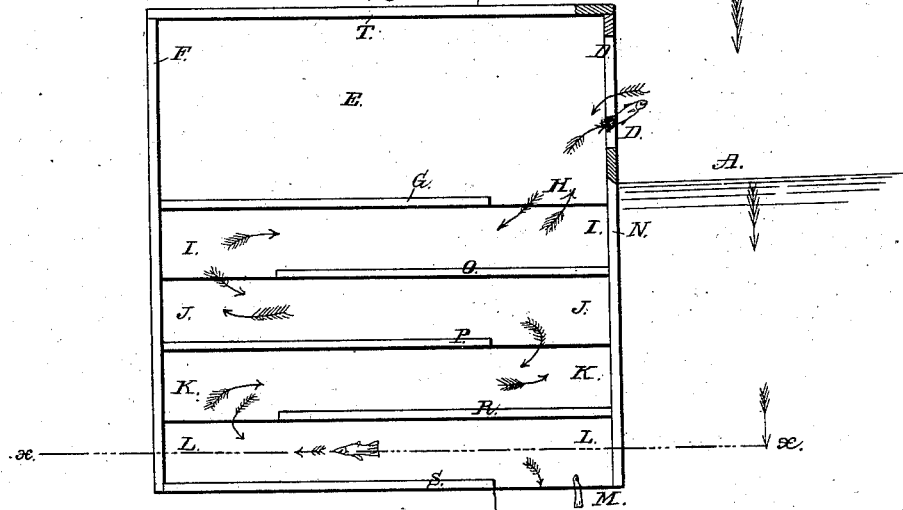
Witnesses:
Inventor:

UNITED STATES PATENT OFFICE.

DANIEL STECK, OF HUGHESVILLE, PENNSYLVANIA.

IMPROVED MEANS FOR FISH TO PASS OVER DAMS.

Specification forming part of Letters Patent No. 55,929, dated June 26, 1866.

*To all whom it may concern:*

Be it known that I, DANIEL STECK, of Hughesville, in the county of Lycoming and State of Pennsylvania, have invented a new and useful Improvement in Devices to Facilitate the Passage of Fish over Dams; and I do hereby declare that the following is a full, clear, and exact description thereof, which will enable others skilled in the art to make and use the same, reference being had to the accompanying drawings, forming part of this specification, in which—

Figure 1 is a vertical section of my improved device, taken through the line $x\ x$, Fig. 2. Fig. 2 is a top view of the same, part being broken away to show the passage for the entrance of the water.

Similar letters of reference indicate like parts.

My invention has for its object to furnish a means by which fish may be enabled to pass over dams in ascending streams; and it consists of the combination and arrangement of a series of inclined planes with each other, with the end of the dam, and with the bank of the stream, as hereinafter more fully described.

A represents the water-level of the top of the dam B, and C represents the water-level at the foot of the said dam. The device is placed at either or both ends of the dam, and is set so far into the bank that it can receive little or no pressure on its upper end, T, from the force of the stream. The water enters through the passage-way D at right angles to the course of the stream, and flows along the inclined plane E till it strikes the wall F, where it is turned back, flows along the side of the wall G and through the passage-way H upon the upper or highest part of the inclined plane I, and so on down the inclined planes J K L, and escapes through the passage-way M into the stream below the dam, being checked in its course by the side walls, F and N, and, after the fall from one inclined plane to the other, by the partition-walls O P R S. This checking the course of the water at the foot of each inclined plane prevents it from acquiring too great a velocity for the fish to swim against it, and also raises it to so great a depth at these points that the fish can easily rise above the falls from one plane to another. These eddies also furnish resting-places for the fish in their ascent.

The amount of water admitted through the passage D may be regulated by a gate, and the apparatus may be protected from flood-wood by a small boom placed in the stream above it.

The device should be built of stone-work, and the number of inclined planes in the series will depend upon the height of the dam and the rapidity of the current of the stream. The planes may be from twenty to twenty-five feet long and from fifteen to twenty feet wide, so as to allow a considerable stream of water to flow through the apparatus.

It has been found by experiment that the velocity of the water will be less and the ascent of the fish more easy if enough water is allowed to flow through not only to fill the passage-ways, but also to overflow the partition-walls G O P R.

I claim as new and desire to secure by Letters Patent—

An improved device for facilitating the passage of fish over dams, formed by combining a series of inclined planes, E I J K L, with each other, with the partition-walls G O P R, with the side walls, F N, and with the end walls, T and S, the whole being constructed and arranged in connection with the end of the dam and with the bank of the stream, substantially as described, and for the purpose set forth.

DANIEL STECK.

Witnesses:
E. D. HURLING,
J. H. HULING.